Inventors
Tadahiko Nakagiri
Hiroshi Shimizu

BY Karl W. Flocks
ATTORNEY

Inventors
Tadahiko Nakagiri
Hiroshi Shimizu

BY Karl W. Flocks

ATTORNEY

TUNE SELECTION APPARATUS USING LIGHT SOURCE AND PHOTOCELL

Filed Feb. 3, 1966

5 Sheets-Sheet 3

Inventors
Tadahiko Nakagiri
Hiroshi Shimizu

BY Karl W. Flocks

ATTORNEY

Inventors
Tadahiko Nakagiri
Hiroshi Shimizu
BY [signature]
ATTORNEY

TUNE SELECTION APPARATUS USING LIGHT SOURCE AND PHOTOCELL

Filed Feb. 3, 1966

Inventors
Tadahiko Nakagiri
Hiroshi Shimizu
BY [signature]
ATTORNEY

United States Patent Office 3,368,080

Patented Feb. 6, 1968

3,368,080

TUNE SELECTION APPARATUS USING LIGHT SOURCE AND PHOTOCELL

Tadahiko Nakagiri, Hino-shi, and Hiroshi Shimizu, Sayama-shi, Japan, assignors to Citizen Watch Co., Ltd., Tokyo, Japan, a corporation of Japan Filed Feb. 3, 1966, Ser. No. 524,797

Claims priority, application Japan, Feb. 9, 1965, 40/6,854; Mar. 29, 1965, 40/17,943; Mar. 30, 1965, 40/18,004, 40/18,468

13 Claims. (Cl. 250—219)

The present invention relates to a unit for detecting a groove of a gramophone record in automatic tune selection apparatus intended for automatically detecting and playing, by means of the detecting unit mounted in a pick-up, a desired recorded band from among a plurality of the recorded bands of a long playing gramophone record. Such device has been proposed by Morton Stimler in his U.S. Patent No. 2,952,464, but said proposed device for detecting a groove of a gramophone record bears a number of shortcomings as will be described below, and, therefore, it was of little practicability.

It is well known that the distance between the pick-up and the face of the record at the time the pick-up scanning above the record is different from the distance when the record is being played. This difference in the distance between the pick-up and the record face occurring under these two different conditions has made it impossible for the record groove detecting device of the prior art to have the photoelectric element positioned always at the focus of the lens of the device. As a result, the real image of the groove was focused out which, in turn, affected the preciseness with which the detection was to be performed. Not only that, but the length of the beam of light which is reflected onto the photoelectric element is extended when the pick-up is scanning at a distance from the record, and this extended length of beam contributed to a great loss of light rays which are reflected. The solution to such loss of light was found only in the provision of a larger sized pick-up. Then there has been a problem of aberration of the lens used, and this aberration hampered the formation of a proper image of the record groove. Moreover, the prior art gave no consideration to the fact that the peripheral profile of gramophone disc varied widely depending upon the makes, and such disparity in the peripheral structure gave rise to miscounting of the grooves. Such miscounting of record grooves was resulted also from the variation in the reflection factor due to the difference in the materials between the records. Thus, it has been, in fact, difficult to apply the same record groove detecting device to all kinds of records in the selection of desired tunes.

The present invention contemplates an improvement of those foregoing shortcomings by the provision of a really practicable record groove detecting unit having a completely novel structure.

The object of the present invention, therefore, is to provide a record groove detecting unit for use in automatic tune selection apparatus with the following features and advantages: that the position of the photoelectric element is not restricted by the position of the lens and the adjustment of the position of the photoelectric element is simplified; that since a reflected image of the mirror face portion of the record is formed on the photoelectric element, there occurs no formation of a defocused image thereon irrespective of the variation in the distance between the photoelectric element and the face of the record; that while it is theoretically impractical to reduce the distance between the object and the screen to less than four times the focal length of a lens where a real image is to be obtained, the unit of the present invention uses no lens in association with the photoelectric element because it utilizes a reflected image of the mirror face portion of the record, so that the photoelectric element may be positioned quite close to the face of the record, and that accordingly, the size of pick-up can be reduced tremendously, and that further that the peripheral grooves of the record can be detected without any failure as will be described later; that the reduced length of beam of light insures that all of the reflected light rays are effectively projected to the photoelectric element so that this facilitates the detection of the desired groove; that the absence of aberration of lens in the formation of a real image insures a sharp reflected image to be formed on the photoelectric element and this, in turn, improves the rising characteristics of the rectangular waves which are produced during the scanning over the un-recorded zones which will be described later; that since the beam of light projected to the face of the record consists of parallel light rays, the size of the area of the record spotted by the beam can be substantially the same with the circumferential size of the lens involved, and this eliminates miscounting the peripheral record groove by the use of two to three photoelectric elements to compensate the noise factors reflected from the face of the record as will be described later; that the absence of a lens for forming a real image contributes to the elimination of a loss of light rays within the lens and saves the cost of providing such lens; and that by minimizing the incident angle of the beam of light projected to the face of the record which will be described later in connection with FIG. 19 of the accompanying drawings, the face of any record can be regarded as an almost perfect mirror face and therefore, constant signals of a great amplitude can be derived irrespective of the colour of the face of the record.

Other objects and advantages of the present invention will be understood by reading the following descriptions with reference to the accompanying drawings of the practicable embodiments which are provided by way of examples only, wherein.

Figure 3:
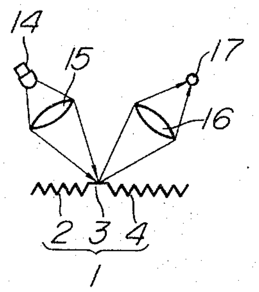
FIG. 3 illustrates the principle of the detector device of the prior art.
Figure 6A:
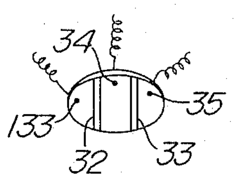
Figure 6B:
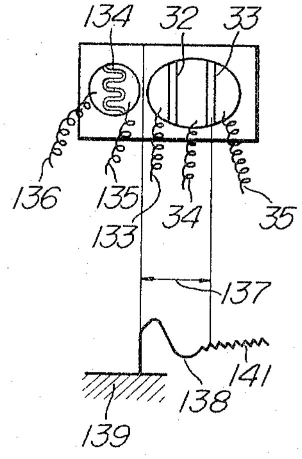
Figure 7A:
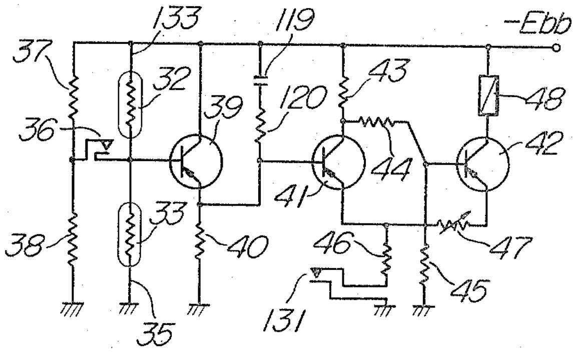
Figure 7C:
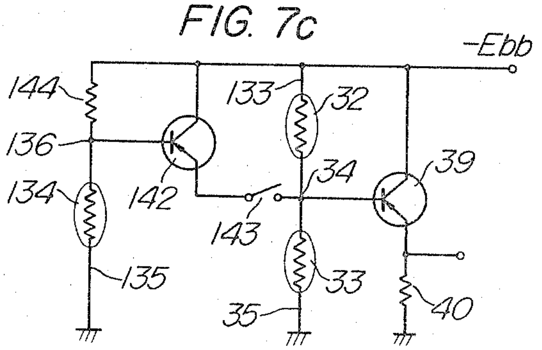
Figure 7B:
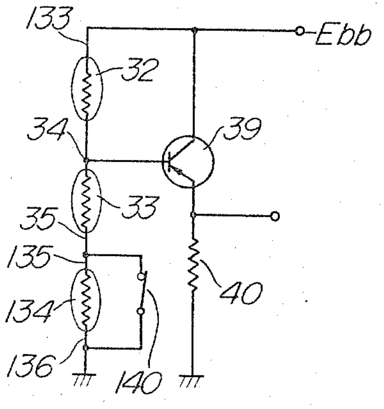
Figure 7D:
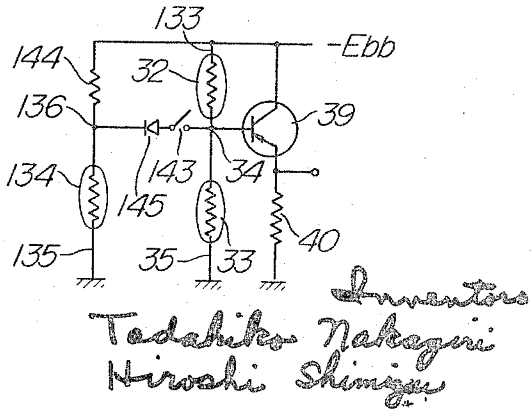
Figures 8, 9A, 9B, 9C, 10A, 10B, 11A, 11B:
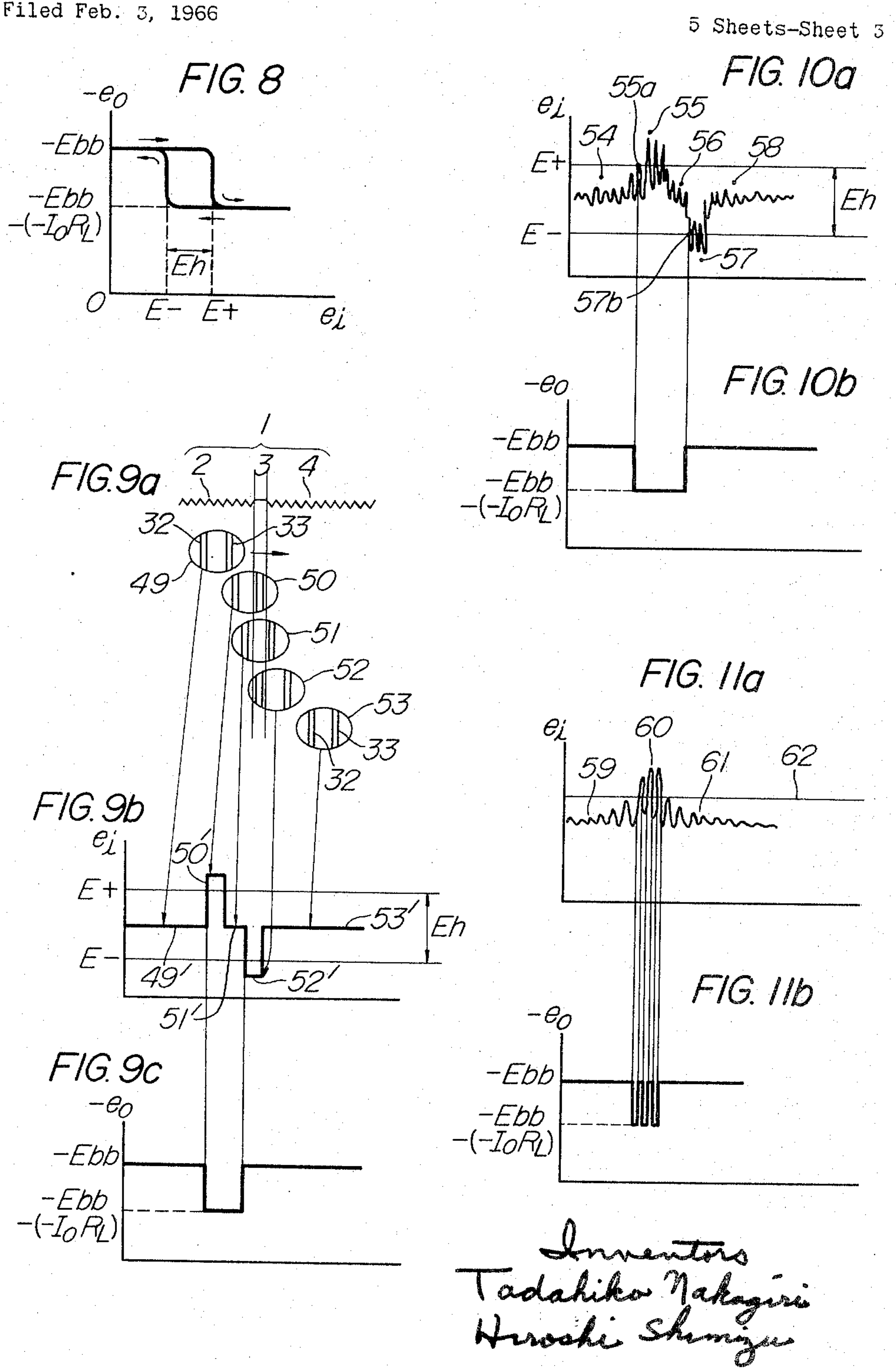
Figures 12A, 12B, 12C, 12D:
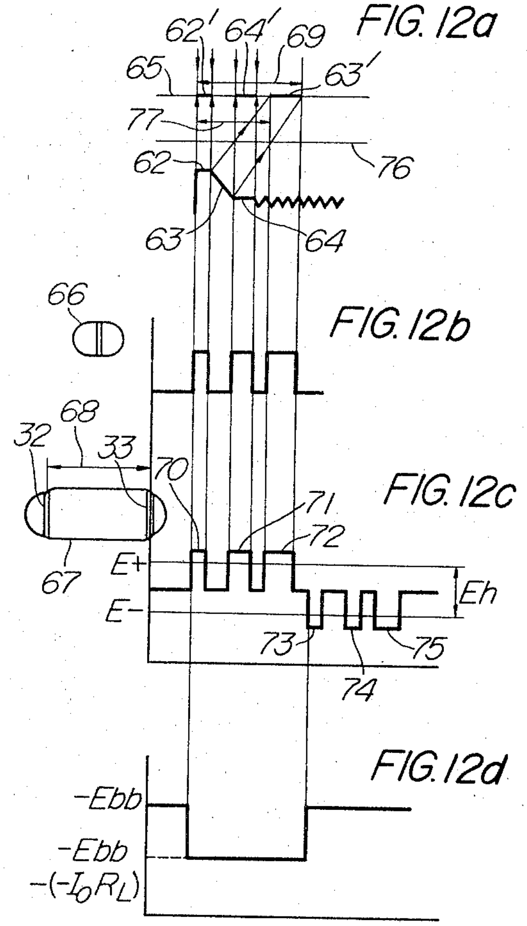
Figures 13A, 13B:
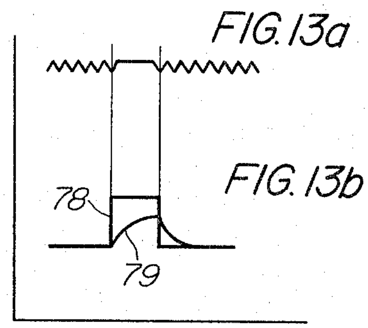
Figures 18A, 18B, 18C, 18D:
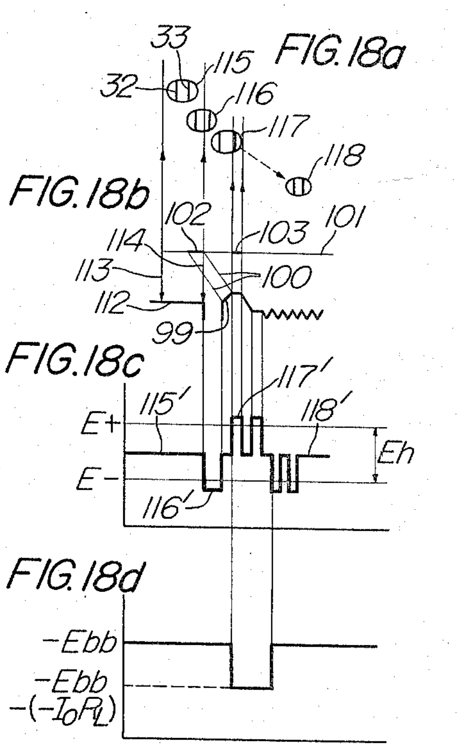
Figure 14:
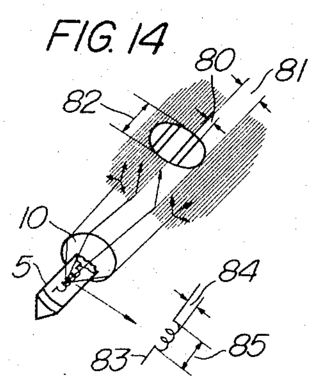
Figure 19:
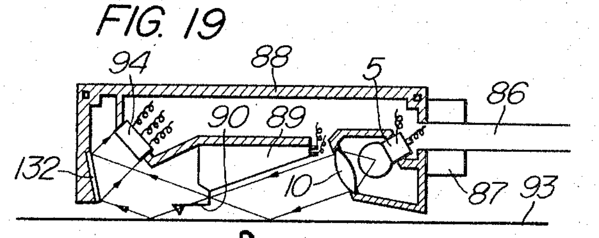
Figure 16:
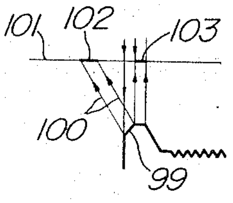
Figure 15:
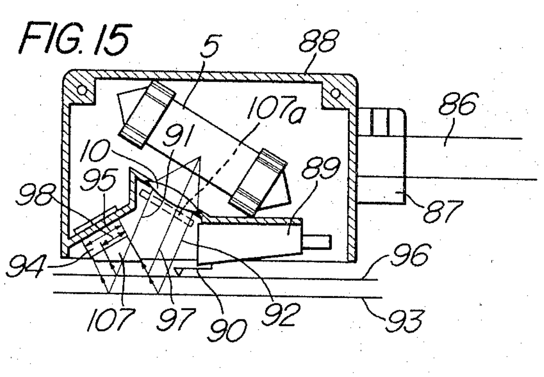
Figures 17, 20A, 20B:
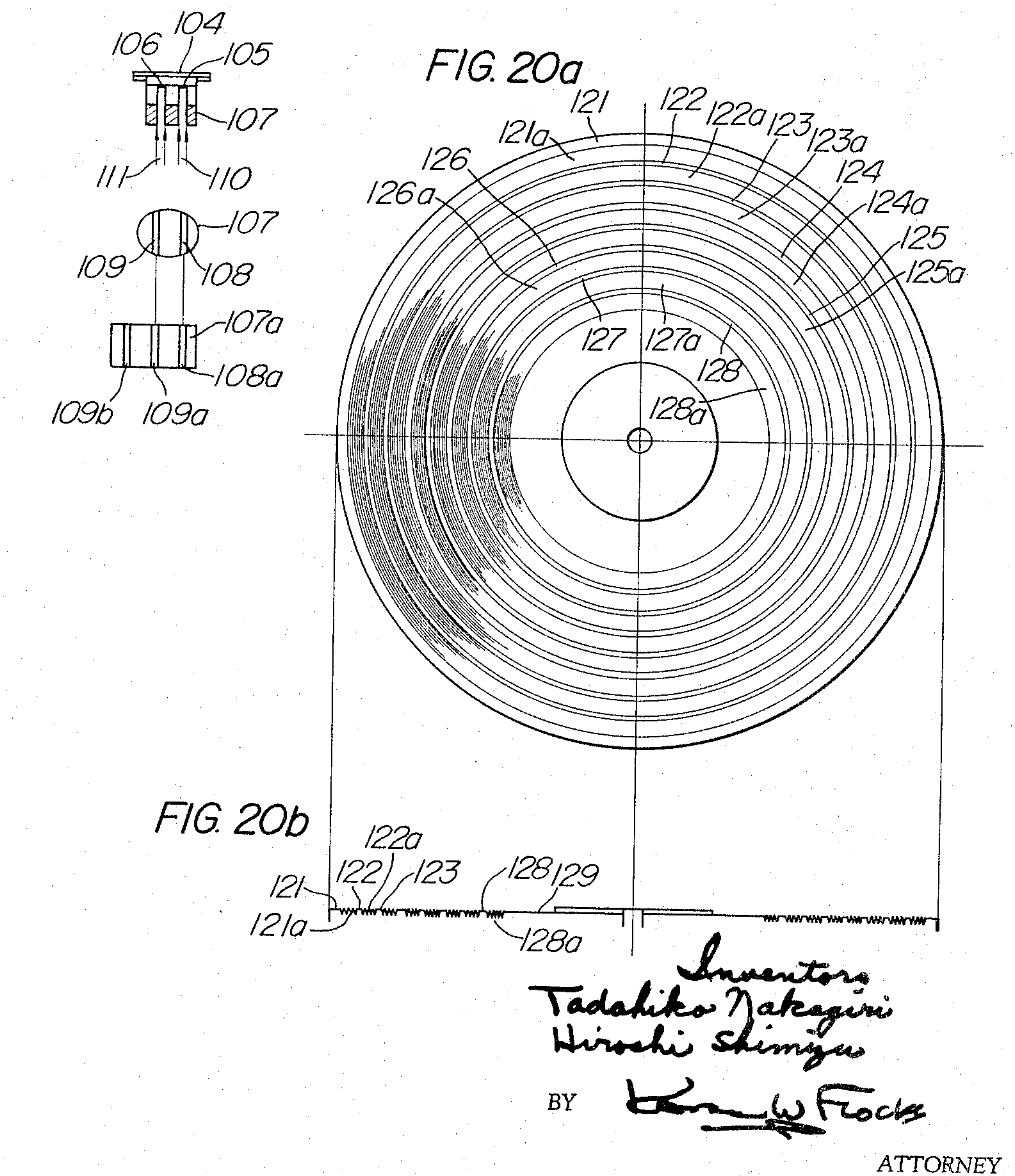

FIG. 6*a* is a plane view showing a photoelectric transducer comprising two photoelectric transducing elements which is suited for use in the detecting unit of the present invention;

FIG. 6*b* is an explanatory drawing showing the detector of the detecting unit of the present invention employing the transducer in FIG. 6*a* in connection with a gramophone record;

FIG. 7*a* is a diagrammatic illustration showing the electric circuit of the detecting unit of the present invention in which the photoelectric transducer in FIG. 6*a* is used;

FIG. 7*b* illustrates another example of the electric circuit of the detecting unit of the present invention in which the detector in FIG. 6*b* is used;

FIG. 7*c* is a diagrammatic presentation of a circuit which is given as still another example of the electric circuit shown in FIG. 7*b* but having one additional transistor amplifier;

FIG. 7*d* illustrates a circuit similar to that in FIG. 7*c* wherein one diode is used in place of the transistor in FIG. 7*c*;

FIG. 8 is a diagrammatic illustration showing the operating state of the Schmidt circuit in the electric circuit in FIG. 7*a*, wherein the vertical axis represents the collector voltage of the transistor while the horizontal axis representing the voltage of the input signal;

FIG. 9*a* is an explanatory drawing showing the respective positions of the photoelectric transducer relative to the groove of the record during the scanning operation of the former;

FIG. 9*b* is a diagrammatic illustration showing the wave form of an input signal in the electric circuit in FIG. 7*a*, wherein the vertical axis represents the voltage of the input signal while the horizontal axis representing the scanning positions;

FIG. 9*c* is a diagrammatic illustration showing the wave form of an output signal obtained from the input signal in FIG. 9*b* through said Schmidt circuit, wherein the vertical axis represents the voltage of the collector of the transistor while the horizontal axis representing the scanning positions;

The foregoing FIGS. 9*a* through 9*c* are presented so as to correspond to each other relative to a groove of the gramophone record;

FIG. 10*a* is a diagrammatic illustration showing the output pulse signal of the detector of the detecting unit of the present invention, wherein the vertical axis represents the voltage while the horizontal axis representing said scanning positions;

FIG. 10*b* is a diagrammatic illustration showing the wave form of the signal produced in a modified form, by virtue of said Schmidt circuit, from the pulse in FIG. 10*a*, wherein the vertical axis represents the voltage of the collector of the transistor while the horizontal axis representing the scanning positions;

The foregoing FIGS. 10*a* and 10*b* are presented in such manner that they correspond to each other relative to the scanning positions;

FIG. 11*a* is a diagrammatic illustration showing the wave form of a pulse signal generated by the detector of the prior art in FIG. 3;

FIG. 11*b* is a diagrammatic illustration showing the wave form of an output signal obtained, through one established level, from the wave-shaped pulse in FIG. 11*a*;

The foregoing FIGS. 11*a* and 11*b* are presented in such manner that they correspond to each other relative to the scanning positions;

FIG. 12*a* is a diagrammatic illustration showing the positional as well as the optical relations between the photoelectric transducer elements and the peripheral edges of a record;

FIG. 12*b* is a diagrammatic illustration showing the wave form of an output signal obtained from one photoelectric element under the conditions illustrated in FIG. 12*a*;

FIG. 12*c* is a diagrammatic illustration showing the wave form of an output signal obtained from two photoelectric elements under the conditions shown in FIG. 12*a*;

FIG. 12*d* is a diagrammatic illustration showing the wave form of the final signal obtained from the signal in FIG. 12*c*;

The foregoing FIGS. 12*a* through 12*d* are presented in such manner that they correspond to each other;

FIG. 13*a* is a diagrammatic illustration showing two recorded bands and an un-recorded zone locating therebetween;

FIG. 13*b* is a diagrammatic illustration showing the comparison between a quick responding signal obtained through a detector and a slow responding signal;

The foregoing FIGS. 13*a* and 13*b* are presented so that they correspond to each other;

FIG. 14 is a perspective view showing a light source suited for use in the detector of the detecting unit of the present invention;

FIG. 15 is a cross sectional view showing a reproduction head equipped with the detector of the present invention (said detector being accommodated within said reproduction head);

FIGS. 16 is another explanatory illustration showing a cross section of the periphery of a gramophone record made in connection with a beam of light projected thereto;

FIG. 17 is a plane view showing a photoelectric element mounted by a mask;

FIG. 18*a* is an explanatory diagrammatic illustration showing the respective scanning positions of a two-slit type photoelectric transducer;

FIG. 18*b* is a diagrammatic illustration showing the pattern of the beam of light reflected by the peripheral face of the gramophone record in FIG. 16 and by an auxiliary mirror;

FIG. 18*c* is a diagrammatic illustration showing an output signal of a transducer which is produced at the time said transducer is actuated as shown in FIG. 18*a*;

FIG. 18*d* is a diagrammatic illustration showing the wave form of the final signal obtained from the signal shown in FIG. 18*c*;

The foregoing FIGS. 18*a* through 18*d* are presented in such manner that they correspond to each other relative to the scanning positions;

FIG. 19 is a cross sectional view showing a reproduction head equipped with the detector of the present invention;

FIG. 20*a* is a plane view showing one kind of gramophone record; and

FIG. 20*b* is a diametrical cross sectional view of the gramophone record in FIG. 20*a*.

In order to explain the foregoing description in further detail, the structure of a photoelectric element made, for example, of CdS will be described further.

Figure 1:
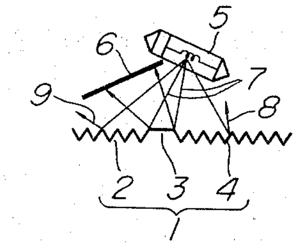
FIG. 1 illustrates the principle of an embodiment of the detector of the detecting unit of the present invention.

FIG. 1 of the drawings is intended to show the principle of the present invention, wherein reference numeral 1 represents a cross section of a gramophone record or disc; numerals 2 and 4 represent recorded bands, respectively; numeral 3 represents an un-recorded zone; numeral 5 represents a light source; and numeral 6 represents a photoelectric element. The light rays from the light source 5 diffuse in all directions. However, only those light rays indicated by the arrow 7 are reflected by the mirror face of the un-recorded zone 3 and reach the photoelectric element 6. The light rays indicated by the arrows 8 and 9 are reflected irregularly by the concave and convex faces of the recorded bands 2 and 4, and do not reach the photoelectric element 6 except for a very small amount thereof. As a result, a quite clear reflected image of the mirror face of the un-recorded zone 3 is obtained on the face of the photoelectric element 6.

Figure 2:
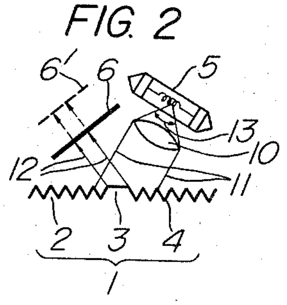
FIG. 2 illustrates the principle of another embodiment of the detector of the detecting unit of the present invention.

FIG. 2 shows an example of the detecting unit of the present invention, wherein a light source 5 is disposed exactly at the focus of a lens 10 to obtain a lighter beam of light and to obtain parallel light rays 11, by which a reflected image of the mirror face portion of the un-recorded zone is formed on the face of the photoelectric element 6. This arrangement insures that the brightness of the reflected image on the photoelectric element does not vary when said photoelectric element 6 is displaced farther from the record face to the position indicated by numeral 6'. On the other hand, even when the light source 10 is displaced farther from the face of the record 1, the brightness of the reflected image on the face of the photoelectric element 6 is not affected, provided that the relative position of said light source to the face of the record is not altered. This is because the effective amount of light rays 11 is determined by the angle 13 defined by the diameter of the lens 10 and also by the focal length of said lens, and is independent of the distance from the face of the record 1.

The fact that the aforesaid arrangement of the unit of the present invention is a novel one which is completely different in conception from the arrangement proposed by Stimler, will be explained in connection with FIG. 3 and FIG. 4.

FIG. 3 represents the arrangement of the detector device proposed by Stimler, wherein the light rays from a light source 14 are focused on the gramophone record 1 through a lens 15, and the real image of the face of the record is, in turn, focused on a photoelectric element 17 through another lens 16.

Figure 4:
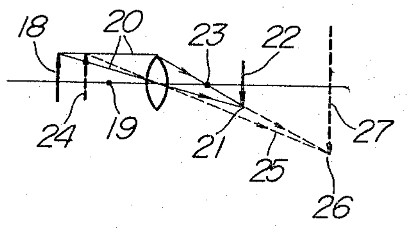
FIG. 4 is an optical diagrammatic illustration showing the principle of the function of the detector device of the prior art in FIG. 3.

FIG. 4 is an explanatory illustration of the FIG. 3, wherein the arrow 18 corresponds to the face of a record 1 in FIG. 3. When this arrow 18 is located at a distance from the lens twice the focal length of the lens (the focus is indicated by numeral 19), a real image of said arrow 18 will be formed at the point 21 of intersection of the light rays 20. This point of intersection of the light rays is located at a distance twice the focal length of said lens from the lens. The ratio of the size of the image formed to that of the original is 1:1, and the reflected image is an inverted one. Now, if, in FIG. 3, the record disc 1 is assumed to have been displaced to a position closer to the lens 16, it means that the arrow 18 in FIG. 4 has been displaced to the position indicated by numeral 24, and a real image indicated by the dash line arrow 27 is formed by virtue of the light rays indicated by the dash lines 25 at a position indicated by numeral 26. In this case, an enlarged inverted image is formed. At such occasion, however, there is formed no clear image of the arrow 24 at the position indicated by numeral 21, but the reflected image formed at point 21 is blurred, since this point 21 is out of the focus of the lens.

Figure 5:
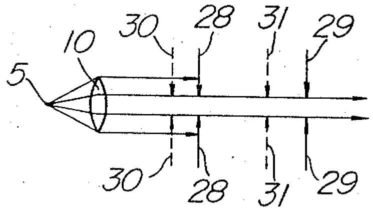
FIG. 5 is an optical diagrammatic illustration showing the principle of the detector of the present invention provided in FIG. 2.

FIG. 5 is an explanatory illustration of the structure of the present invention in FIG. 2, wherein the face of the record 1 is designated by numeral 28. Here, the light rays from the light source 5 are corrected so that they may be projected as a substantially parallel beam of light by the lens 19, with a result that only those light rays which have not been diffused by the arrows 28 reach the position indicated by numeral 29 and produce thereat the undiffused portion between the arrows 28. Whether the arrows 28 are displaced to the position indicated by numeral 30 or whether the arrows 29 are displaced to the position indicated by numeral 31, there is caused neither blurring of the formed image, inversion of the formed image, nor a change in the size of the formed image as is observed in the case of FIG. 4.

Returning now to FIG. 2, the detection of an unrecorded zone 3 of the gramophone record 1 is effected simply by applying a beam of parallel light rays to the face of the record so that the recorded bands 2 and 4 remain to be dark while the un-recorded zone 3 may be illuminated, and it is to be noted that there is no need of forming a real image of the recorded band and also a real image of the un-recorded zone as are necessary in the device of Fig. 3 and Fig. 4 of the prior art.

The fundamental difference between the reflected image of the mirror face portion of a gramophone record in FIG. 2 and the real image shown in FIG. 3 is found in that the former is based upon the principle that when a beam of light strikes against a mirror, only the portion of the mirror face exposed to the beam of light is reflected while the remainder portions not exposed to the beam of light remain to be dark and this requires no lens, whereas the latter uses a lens to focus an inverted image of an object on a photoelectric element. In other words, in the case of FIG. 2, the magnitude of the brightness of the light at the light source which is positioned in a certain direction acts directly as the input signal of the photoelectric element 6. In the case of FIG. 3, however, irrespective of the number of the light sources and of the directions in which they are positioned, the magnitude of the brightness of the light reflected from the face of the record acts, after all, as the input signal of the photoelectric element 17. Therefore, when a black line drawn on a sheet of white paper is to be detected by the method shown in FIG. 2, the portions of the paper which are white reflect the light rays in irregular directions and form no input signal for the photoelectric element 6. According to the method of FIG. 3, however, an input signal is formed even where there are irregular reflections of light rays.

It is to be noted, however, that the object which the detecting unit of the present invention deals with is a gramophone record. Since the face of a gramophone constitutes a mirror face, the detecting unit shown in FIG. 2 is simple but sufficient to work with a record, and also this unit has a number of advantages over the prior device shown in FIG. 3.

Furthermore, the present invention provides a completely novel means and circuits for dealing with the detected wave forms.

FIG. 6*a* shows the arrangement of the unit of the present invention wherein CdS is used as the photoelectric element of a two slit type. Reference numerals 32 and 33 represent sensitive elements, while numerals 133, 34 and 35 representing electrodes, respectively. This arrangement of two-slit type photoelectric element is indeed one of the important features of the present invention, and the reason why such arrangement is advantageous will be made clear as the statement proceeds. With respect to FIG. 6*b*, however, its description will be made later.

FIG. 7*a* shows an example of the use of the photoelectric element shown in FIG. 6*a*, wherein reference numerals 32 and 33 correspond to the two slits of CdS in FIG. 6*a*. FIGS. 7*b* and 7*c* will be described later. Numeral 36 represents a switch operable in association with the vertical movement of the pick-up in such manner that it is in the "open" state while the pick-up is scanning above the record so that only the slits of CdS 32 and 33 are actuated. This switch is closed while the pick-up is lowered on the face of the record, namely, while the record is being played, so that the resistors 37 and 38 are connected parallel relative to CdS photoelectric element, respectively. The reason for the provision of the resistors 37 and 38 will be described. It is well known that the response of CdS is generally slow. While the CdS photoelectric element is scanning at a considerable speed above the record, therefore, the magnitude of the signal indicating the un-recorded zone is small. While the record is being played, however, the pick-up travels across the record at a very low speed, and therefore, the magnitude of said signal is considerably increased, and the magnitude of the noise increases accordingly. In other words, when the pick-up is in the lowered positon on the face of the record through the action of the switch 36, the sensitivity of the CdS photoelectric element is automatically decreased.

The transistor 39 is so connected as to form an emitter follower. The reason of this arrangement will be described. Owing to the nature that the CdS 32 and 33 have a high value of resistance and to the fact that the amount of the light rays reflected from the surface of the record is not sufficient to cause any change in their resistance value, no substantial drop in the value of resistance of said CdS takes place at the time the signal is detected. Because of this, the input impedance of the transistor 39 is increased to somewhere near $\beta$ times the value of the resistor 40, while on the other hand, the output impedance is lowered to a level equal to the value of the resistance 40 to match the input impedance of the Schmidt circuit of the following stage ($\beta$ representing the amplification factor of the transistor).

The transistor 41 and 42 form a Schmidt circuit and the loop gain thereof is arranged to be greater than 1. Being a cathode-coupled binary circuit, it bears two stable states, and it is now assumed that the transistor 41 is in the "on" state, while the transistor 42 in the "off" state.

The condenser 119 and the resistor 120 are operable in such manner that a negative voltage is applied to the base of the transistor 41 with an appropriate time constant when the Schmidt circuit is connected to power source to render the transistor 41 "on" first. When a detected signal whose impedance has been reduced by the transistor 39 is produced at the terminals of the resistor 40, and this signal input varies in the positive direction and is applied to the base of the transistor 41, the terminal voltage of the collector resistor 43 approaches zero, and a voltage which is a part of the power source voltage divided by the resistors 44 and 45 at an appropriate ratio is applied to the base of the transistor 42, rendering the transistor 42 "on."

Being a cathode couple arrangement at the resistor 46, said "on" state of the transistor 42 brings the transistor 41 into the "off" state. As the loop gain is greater than 1, the foregoing phenomenon takes place all of a sudden when the input voltage of the resistor 40 has reached a certain level by virtue of the positive feed back action. It is assumed that the input voltage at this point is E+. Next, when the input signal of the resistor 40 increases in the negative direction and is applied to the base of the transistor 41, the terminal voltage of the collector resistor 43 approaches the voltage of zero, and the collector voltage approaches —E*bb*. The resistors 44 and 45 divide this latter voltage and the thus divided voltage is applied to the base of the transistor 42.

However, the transistor 41 being in the "off" state, unlike the case where the input voltage is E+, said divided voltage is elevated above the level noted when the transistor was in the "on" state. Because of this, even when the signal voltage drops to the level of E+, the transistor 42 does not change the state from "on" to "off," but the positive feed back action occurs for the first time when the voltage has dropped further to the level of E— in just the same way as in the preceding case.

Therefore, if the loop gain is greater than 1, there occurs the so-called phenomenon of hysteresis that there are two levels, E+ and E—, at which a signal input is reversed when the signal input varies in the positive and the negative directions. This hysteresis phenomenon can be quite effectively utilized to work against the noise of the record face as will be described later.

The resistor 47 is intended for adjusting the loop gain so that the width E*h* between the levels E+ and E— may be varied, and this width can be established appropriaely by examining the amplitudes of the signal and noise ratio of the record.

The adjustment of the width E*h* can be effected either by alterning the value of the collector resistor 43 or by altering the dividing ratio of the resistors 44 and 45.

The contact 131 is intended for putting the transistor 42 into the "off" state by breaking the contact 131 after said transistor 42 has been shifted to the "on" state. When subsequently the contact 131 is made, the transistor 42 still remains to be in the "off" state. Unless the next positive pulse is introduced into the base of the transistor 41, said transistor 42 never returns to the "on" state. Accordingly, this contact which is generally called "reset switch" is used when it is desired to stop the playing of a certain tune during its being played or when the performance has come to an end.

Reference numeral 48 represents a relay, which is put into "on" and "off" in association with the on-off shifting of the state of the transistor 42. By making or breaking the contact of this relay, the exact position of the unrecorded zone for a selected tune band of a gramophone record which is represented in the form of an output can be obtained.

FIG. 8 is an explanatory illustration of the hysteresis shown in FIG. 7*a*, wherein the magnitude of an input signal $e_i$ has increased from zero to E+, the state of the collector voltage $-e_0$ is shifted from the "off" state of —E*bb* to the "on" state of $-Ebb-(-IoR_L)$, and thereby a further increase in the $e_i$ will not cause any change in $-e_0$. When subsequently $e_i$ has dropped to the level of E+, the $-e_0$ will not undergo any change because of the hysteresis. It is only when $e_i$ has decreased to the level of E— that the $-e_0$ is shifted from the "on" state of $-Ebb-(-IoR_L)$ back to the "off" state of —E*bb*. Said $-IoR_L$ represents the terminal voltage of the relay 48; I*o* represents the electric current passing through the relay 48; and $R_L$ represents the terminal resistance of the relay 48.

In FIGS. 9*a*, 9*b* and 9*c*, the input wave form and the output wave form obtained when the two CdS slits passes the un-recorded zone of the record are shown so that they correspond to each other.

When said CdS slits are positioned at 49, the recorded band 2 shows itself as a portion of diffused light to the slits 32 and 33 and both slits are "dark" or are not exposed to an appreciable amount of light rays from said band to actuate the slits. The level of the input point 34 in FIG. 7*a* at such time is established as indicated by numeral 49' intermediary of the width of E*h* in FIG. 9*b*. When the CdS slits are displaced and arrive at the position 50, the slit 33 is lighted up by the reflected image of the mirror face portion of the un-recorded zone 3, while the slit 32 remains to be "dark." As a result, the resistance value of the slit 33 in FIG. 7*a* drops, while the resistance value of the CdS slit 32 remains as it has been. Whereupon, the level of the input point 34 is elevated to the level of 50' in FIG. 9*b*. When the CdS photoelectric element is next displaced to the position 51, both of the slits 32 and 33 become dark, and again the level of the input point 34 returns to the level indicated by numeral 51' which is the same with the level 49' in FIG. 9*b*. When the element is next displaced to the position 52, the slit 33 remains to be "dark," but the slit 32 is lighted up, and therefore, the resistance value of the CdS 33 in FIG. 7*a* remains to be held at the initial high level, while the resistance value of the CdS 32 drops, causing the level of the input point 34 to drop to that of 52' in FIG. 9*b*. When the CdS photoelectric element arrives next to the position 53, both of the slits 32 and 33 become "dark," and the level of the input point 34 in FIG. 7*a* returns to 53' which is at the same level with the one 49' in FIG. 9*b*. Therefore, when the CdS photoelectric element travels from the position 49 and across the unrecorded zone 3 to the position of 53, a signal which is vertical relative to the initial level 49' is produced as shown in FIG. 9*b*.

This signal is converted to that of a low impedance by the transistor 39 of the emitter follower connection in FIG. 7*a* and works as an input signal of the transistor 41 of the Schmidt circuit. The level 49' is established, as in the case of FIG. 9*b*, intermediary of the width E*h* of the hysteresis of the Schmidt circuit, and the levels E+ and E— are established close to the top portions of the input signals 50' and 52', respectively. Then the input wave form in FIG. 9*b* is shaped into a rectangular wave in FIG. 9*c* through the said Schmidt circuit.

FIG. 9*c* represents the collector voltage of the transistor 42 which is the voltage for actuating the relay 48. When the CdS photoelectric element travels the unrecorded zone in FIG. 9*a* from the position 42 to the position 53, the collector voltage of the transistor 42 drops from the level of —E*bb* to the level $-Ebb-(IoR_L)$, and the state of the relay 48 is shifted from "off" to "on" by virtue of the voltage $IoR_L$ and a signal indicating that "the CdS which is contained in the pick-up has passed the un-recorded zone" is demonstrated by the relay 48 in the form of an output.

The signal wave form in FIG. 10*a* is one which contains noise components actually detected from the face of the record. In fact, the beam of light reflected from the face of the record bears such wave form as shown in FIG. 10*a* where it is seen that noise wave form is modulated by signal wave form due to such factors, for example, as the dust deposited on the face of the record, the uneven face of the disc, the uneven luster of the record face or the disparity between the movements of the needle and the CdS photoelectric element which occurs while the record is being played. Now, if the levels E+ and E− are to be established as illustrated, the collector voltage of the transistor 42 in FIG. 7*a* will be reversed, at the point 55*a* where the signal 55 has crossed the level E+ for the first time, from $-Ebb$ to $-Ebb-(IoR_L)$ as shown in FIG. 10*b*. After that, the "on"-"off" states of the transistors 41 and 42 are never reversed no matter how often a noise wave form may traverse the level E+. A reversion of the "on"-"off" states of the transistors will take place only when the first falling point 57*b* of the signal 57 has passed the level E−. after that, the collector voltage of the transistor 42 which has been shifted to $-Ebb$ is never reversed, in just the same way as has been described in connection with the level E+, no matter how often a noise wave form may pass the level E−. The reversion of the voltage is effected only when the signal has next arrived the level of E+.

Description will now be made to the fact that the wave form which is produced in the uprising and downfalling shape and the two levels E+ and E− established for a detected signal are extremely stable for the detection of an un-recorded portion of the record. The signal 55 in FIG. 10*a* represents a signal produced when the CdS photoelectric element is positioned at 50, or in other words, when the slit 33 is in the state of being "lighted up" meaning elevated illumination and the slit 32 is "dark." The noise which can be thought of at this point is such one as is represented by the darkening of the slit 33 due to such factors as the dust deposited on the face of the record or the uneven face of the record. The magnitude of the noise becomes maximum when both of the slits 32 and 33 have become "dark." This is a state which is encountered when the CdS photoelectric element is positioned at either of the positions 49 and 51 in FIG. 9*a*. In other words, the minimum amplitude of the signal 55 in FIG. 10*a* extends only up to the signal 54 or signal 56, and never extends farther down to E−. The falling of the voltage of the signal to the level of E− means that the CdS photoelectric element in FIG. 9*a* has shifted to the position 52. It is quite unlikely that the slit 33 is "darkened" and the slit 32 is "lighted up" when the CdS photoelectric element is positioned at 50 even when such factor as the uneven face of the record is taken into account. Accordingly, it contributes greatly toward the stabilization of the detection of the signal of an un-recorded zone to extend the signal of the second slit 32 below the established level as seen at 57 in FIG. 10*a*. This also means that the signal having detected the record face has become doubled of its amplitude.

The stabilization of the detection of the signal of an un-recorded zone will be readily understood by reference to FIG. 11*a* and FIG. 11*b*.

FIG. 11*a* illustrates the case where only one slit of CdS is used and where a single level is established. Since, in this case, the signal is generated only in one direction as indicated by numerals 59, 60 and 61, the signal 60 passes beyond the established level 62 a number of times. At each time it passes this level, the shaped wave is reversed as shown in FIG. 11*b*. Even if anoher level is established in addition to the one indicated at 62 to constitute a Schmidt circuit having two levels E+ and E−, it is indeed difficult to expect a desired correct shaped-wave uniformly on all kinds of record if the wave form of the signal is that of one direction. As a result, when the photoelectric element comprising CdS has passed only one un-recorded zone, the signal which is produced at such time indicates as if the pick-up had passed several such zones, owing to the noise produced, and the relay 48 will thus make miscounting.

Another advantage of using two slit type CdS as shown in FIG. 6*a* is in that these two CdS slits can be formed with the same material and also that they can be arranged so that their resistance ratio may be 1:1 because of the fact they are made of the same material, so that these slits may undergo uniform changes to the possible changes in the humidity and the temperature, which results in that the level of the input point 34 in FIG. 7*a* is never altered. Since the level of the input point 34 represents a value obtained by dividing the voltage of $-Ebb$ in accordance with the resistance ratio of the CdS 32 and 33, there will be no fluctuation of this level so long as these two slits undergo a change in the same ratio.

The foregoing fact brings forth such great advantage that the level of the input point 34 will not undergo any fluctuation even when the reflection factor of the face of the record may vary depending upon the kind of the record. Gramophone discs include those which bear fresh luster, those which have been used and have lost much of the luster of the face, those which are made of a translucent material, those which are coloured or those which have coloured patterns. No matter what kind of record may be used, the level of the input point 34 will never fluctuate because of the foregoing reason, provided that the reflected beam of light is projected to each of the slits 32 and 33 of the CdS photoelectric element under the same and equal conditions.

The reason for applying a beam having a certain area onto the face of a record is because the reflected beam of light has to be projected to each of the slits 32 and 33 of the CdS photoelectric element under uniform conditions. FIGS. 12*a*, 12*b*, 12*c* and 12*d* are illustrative of the fact that the provision of two slits in CdS photoelectric element is effective for the prevention of a possible miscounting of the peripheral portion of a gramophone record.

The peripheral portion of a record is, in general, of such shape as is indicated by numerals 62, 63 and 64 in FIG. 12*a*. When a beam of light is spotted to such peripheral portion from above thereof, such reflected images from the mirror portions of the record as are those indicated by numerals 62', 64' and 63' are formed at the scanning position 65 of the photoelectric element. The reflected image 63', in particular, is formed to the right of the image 64' since the former is an inclined groove. FIG. 12*b* represents the case where this peripheral groove is scanned with a CdS photoelectric element 66 having one slit. The detected wave form which corresponds to FIG. 12*a* is seen to have three wave forms as shown in FIG. 12*b* despite the fact that only one peripheral groove has been scanned, and thus miscounting is resulted.

FIG. 12*c* illustrates the case where the periphery groove is scanned by a CdS photoelectric element provided with two slits to overcome such shortcoming. By arranging the distance 68 between the two slits so as to be greater than the width 69 of the reflected image comprising 62', 64' and 63' in FIG. 12*a*, a detected wave form as is indicated by numerals 70, 71 and 72 is produced by the slit 33, while on the other hand, another wave form as is indicated by numerals 73, 74 and 75 is produced by the slit 32 based on the same principle as has been described in connection with FIGS. 9*a* and 9*b*. By establishing E+ and E− as indicated in the drawing, the signal wave form in FIG. 12*c* is shaped into a pulse as indicated in FIG. 12*d*, based on the same principle with that for FIGS. 9*b* and 9*c*. Therefore, there is produced only one pulse for one peripheral groove, and there is caused no miscounting of the grooves.

The distance 68 between these two slits in FIG. 12*c* is preferably arranged as small as possible. Since in a record disc which bears colour patterns or which has an uneven face, the reflection factor may vary with the small portions of the face of the record, it is necessary that each of the slits receive a beam of light which is under the same condition relative to the other beam of light in order to have both of the slits undergo a change at a uniform ratio and to prevent any fluctuation of the level of the input point 34 in FIG. 7*a*. In order to accomplish these purposes, it is desirable that the distance or the space between these two slits be arranged as small as possible. As a means to reduce this distance 68, it needs to be noted that the scanning line 65 of the photoelectric element in FIG. 12*a* which is closer to the face of the record will contribute to the reduction of the distance between the reflected image 64' and the reflected image 63' of the inclined portion of the periphery of the record. By so disposing the photoelectric element, the total length of the reflected image 69 is reduced. When, for example, the face 65 of the photoelectric element is disposed at a line 76 which is close to the face of the record, the total length of the reflected image obtained is reduced to such extent as is indicated by numeral 77. The space between the slits may accordingly be reduced.

A photoelectric element can thus be located quite close to the face of a record simply because the present invention utilizes a reflected image of a mirror face portion and does not use a lens to focus a reflected image.

FIGS. 13*a* and 13*b* are illustrative of such wave form as is produced due to the slow response of CdS. When the face of a record having a cross section as shown in FIG. 13*a* is detected, the ideal wave form to be obtained would be such one as shown at 78 in FIG. 13*b*. In view of the fact, however, that the source of the light rays which are projected to the surface of the record is located within the pick-up assembly, no intensive light rays can be expected from such arrangement, and accordingly the CdS photoelectric element shows a slow response. In addition, when the pick-up scans above the face of the record, it passes an un-recorded zone much faster than it travels across the record when the record is being played. Therefore, the rising of the wave form is not sharp as is indicated at 79, and the amplitude is reduced. This makes both the detection of the un-recorded zones and the exact positioning of the pick-up upon the detected groove difficult.

FIG. 14 illustrates a detecting unit which is arranged in such manner that the wave form indicated at 79 in FIG. 13*b* may be produced in a shape as close to the wave form indicated by 78 as possible. Description will now be made to individual part of the detecting unit.

By reducing the distance between the slits of the CdS photoelectric element considerably narrower than the width 81 of the un-recorded zone, the rising time of the signal can be reduced. While a greater length 82 of the slits contributes to an increase in the amplitude of a signal, it is not practical to use excessively lengthy slits because the grooves of the record are formed with gentle circles. It is desirous, of course, that the CdS photoelectric element is located closer to the face of the record. By minimizing the diameter 84 of the winding of the tungsten filament 83 of the light source 5, the wound tungsten filament will provide a point light source relative to the lens 10, and thus a sharp reflected image of the mirror portion of the record will be obtained. The linear length 85 of the wound tungsten filament may be considerably great. In such case, however, the coil portion of the tungsten filament is disposed substantially parallel to the grooves of the record, and this arrangement of the coil of tungsten filament relative to the grooves provides a sharp reflected image of the mirror face portion of the record despite possible development of aberration of the lens 10. This is based upon the principle that when a pencil is placed under a linear tubular fluorescent lamp perpendicular to said lamp, the shadow of the pencil projected by the pencil is blurred by virtue of the incident lateral light rays. When this pencil is placed parallel to said linear lamp, however, a relatively sharp shadow of the pencil is obtained because of the scarcity of lateral incident light rays.

Because of the foregoing structure and arrangement of the detecting unit of the present invention, a sharp reflected image is obtained, which, in turn, reduces the first rising time of the detected wave form.

FIG. 15 illustrates the pick-up structure of the present invention which embodies the foregoing considerations. Reference numeral 86 represents a pick-up arm; numeral 87 represents a socket; numeral 88 represents a case; and numeral 89 represents a cartridge. A stylus 90 is so arranged as to be disposed immediately behind the spotted area. The stylus need to be disposed close to the spotted area. Because, since the grooves are circular, the position of the tip of the stylus relative to the point of detection by the photoelectric element on the record faces varies as the pick-up proceeds from the periphery to the center of the record. The light rays from the light source 5 are converted to a parallel beam 91 and 92 by the lens 10 and said beam is reflected, as illustrated, on the record face 93 during the scanning and is projected onto the entire face of the CdS photoelectric element 94. When the stylus is placed on the record face 96 during playing, however, the parallel beam of light 91 and 97 which is reflected at the record face is protected therefrom onto the limited area 98 of the photoelectric element 94. Accordingly, the CdS photoelectric element is actuated partially while the record is being played. In actual operation, however, the light receiving area of the face of the CdS photoelectric elements during the period the record is being played is limited to about two thirds of the total face area of the photoelectric elements, and therefore, the amplitude of the detected signal drops to about two thirds of the amplitude obtained when the light is projected to the total face area of the photoelectric elements. This amount of decrease in the amplitude of said signal can be made substantially equal to the fraction of decreased amplitude which arises from the slow response of the CdS photoelectric elements when scanning above the face of the record, and the amplitude of the detected signal can be made uniform irrespective of whether the record is being scanned or whether the record is being played. For this reason, the sensitivity switching resistors 37 and 38 and the sensitivity changeover switch 36 for the CdS photoelectric element which have been described in connection with FIG. 7*a* may be omitted when required.

FIG. 16 shows the beam of light reflected from the peripheral portion of a record having a cross section different from that described previously. The light rays projected from above said record face onto the periphery of the record having an inclined surface as indicated by numeral 99 are reflected outwardly of the periphery of the record as indicated by numeral 100, forming an image 102 at the scanning position 101 of the pick-up. Since this image is formed outwardly of the periphery of the record, if the detecting unit of the pick-up detects this image, the pick-up will descend at a point outside the periphery of the record. It is, therefore, desirous that this image 102 be not detected, but that, instead, the image 103 which is reflected upwardly of the periphery of the record be detected.

FIG. 17 illustrates a concrete means of solving such problem. A mask as shown by numeral 107 which has openings corresponding to the slits 105 and 106 of the CdS photoelectric element 104 is prepared. The widths of the slits 108 and 109 of the mask are so formed as to be the same with the widths of the slits 105 and 106 of the CdS photoelectric element. By this arrangement, the CdS slits 105 and 106 are exposed only to those light rays which come from just under said slits, and not to such inclined incident light rays as are shown in FIG. 16.

A further advantage of the provision of a mask is that it is effective in producing a signal which is the same as that produced on a black record also on such records having a greater reflection factor as those, for example, which are of a cream-white or a translucent reddish colour. As has been described in connection with FIGS. 9a and 9b, the amplitude of the signal obtained from a two slit type photoelectric element is determined by the ratio of the resistance between the two CdS elements. Even when the resistance value of the first CdS element has decreased by detecting an un-recorded portion, such amplitude of the signal as shown by numeral 50' in FIG. 9b is not obtained so long as the resistance value of the second CdS element is low. It is often the case with a cream-white or a translucent record that its reflection factors are excessively great, and the resistance value of the second CdS element undesirably decreases. This is mostly caused by the irregular reflection of light rays on the surface of such record and the photoelectric element is exposed also to the inclined light rays among the irregular reflections. The mask shown in FIG. 17 blocks such incidence of light rays coming from the directions which are inclined relative to the surface of the photoelectric element, and keeps the value of resistance of the second CdS element from decreasing. A similar result is obtained from the mask 107 in FIG. 17 when it is mounted on the light source side or when it is mounted on the CdS element or when a mask is used on each of the light source side and the CdS element. Numeral 107a shows a case where the light source is masked in such manner as shown in FIG. 15. The provision of three slits in the mask is effective for such record which has a more complicated cross section of periphery than the one shown in FIG. 16. In this case, the two slits 108a and 109b of the mask are so disposed as to correspond to the two slits of the CdS element. A third beam of light can be projected through the remaining third slit 109b of the mask onto the inclined surface of the periphery of the record, and by this arrangement, a more stable reflected image of the mirror face portion of the periphery of the record may be obtained.

FIGS. 18a, 18b and 18c illustrate the case where a two-slit type CdS photoelectric element is used by the reflected image of the periphery having an inclined face in FIG. 16 is dealt with in a manner different from the foregoing method.

Numeral 112 in FIG. 18b represents a plate having a mirror face formed on the upper surface thereof. This plate is disposed at a small distance from the peripheral edge of the record. The light rays 113 and 114 coming from above the plate is reflected at the mirror face 112 of the plate in the upward direction. When the pick-up scans at a level indicated by numeral 101, the CdS photoelectric element moves from the position 115 to the position 118 in FIG. 18a. At the position 115, both of the slits 32 and 33 are "lighted up" and accordingly the resistance ratio of these CdS slits is not altered, and the output voltage of the CdS slits 32 and 33 at such time is shown to be at the level 115' in FIG. 18c, respectively. When the photoelectric element is displaced to the position 116, however, only the slit 33 is "darkened," and the output voltage of said slit 33 is lowered down to the level 116'. Although the level E— has been surpassed by said voltage 116', the level E+ has not been traversed yet. Therefore, the Schmidt circuit is not reversed as has been described previously in connection with FIGS. 9b and 9c. However, the level E+ is for the first time traversed at the position 117 in FIG. 18a, whereupon the Schmidt circuit is reversed. FIG. 18d illustrates such state. Subsequent process of the photoelectric element traversing the periphery of the record is similar to those described in connection with FIGS. 12c and 12d.

In short, by providing a plate 112 having a mirror face, and by placing the two slits of the CdS photoelectric element completely within the beams of reflected light, the effect of the reflected image 102 of the inclined surface of the periphery can be eliminated.

FIG. 19 shows a detecting unit which is effective for cream-white or translucent discs other than the black ones. The difference between this arrangement and that shown in FIG. 15 is in that in the former the beam of light from the light source 5 is projected at a very small angle relative to the record face, and therefore, all of the incident light rays are reflected irrespective of the colour of the face of the record, whether it is white, red or black, or whether the record is made of a translucent material. By this arrangement, the light rays from the light source are reflected in such manner as if they were projected onto a mirror face. This arrangement not only insures that the detected signal does not vary with the material with which the surface of the record is made, but also permits the amplitude of the detected signal to be greatly increased because of the elevated reflection factor. Numeral 132 represents a mirror for projecting the reflected beam of light onto the CdS photoelectric element 94. In the case where the incident light rays are perpendicular to the face of the record, most of the projected light rays are absorbed, if the face of the record is black, by such face of the record, but in case the record has a white surface, the projected light rays are reflected irregularly, and in case the record is made of a translucent material, a majority of the projected light rays pass through the disc. The light rays which are reflected in uniform direction from the surface of these records relative to the incident angle of the light rays, are very scarce. It is known, however, that as the angle of incident light rays is reduced toward zero, meaning below the critical angle, the surface to which the light rays are projected serves as a mirror face from the principle of the index of refraction, even in the case the said surface is that of a transparent matter such as glass, provided that the face of the matter is even.

FIG. 19 illustrates an arrangement of the detecting unit based on the abovestated principle wherein an identical wave form of the detected signal having a great amplitude is obtained on any type and structure of record. In the detecting device where a lens is used to focus a reflected image on the face of a CdS photoelectric element, defocusing occurs due to the variation in the length of the reflected beam from the record face to the CdS photoelectric element, and said device cannot be put to practical use.

An arrangement of detecting unit which works even more effectively on the modified types of periphery of gramophone records is provided in FIGS. 6b, 7b and 7c.

In the arrangement in FIG. 6b, a CdS photoelectric element 134 is provided sideways relative to the CdS photoelectric element having slits 32 and 33 in such manner that the space between the slit 33 and said element 134 is greater than the length 137 of the peripheral edge of the record. The peripheral edge 138 of the record in FIG. 6b does not have any flat surface at all, and when light rays are projected onto this peripheral edge of the record, only a very little portion of the light rays is reflected in the upward direction. In the case of such record, a matter such as a piece of black cloth 139 in FIG. 6b is placed outside the periphery of the record. When the CdS 33 which scans the record face as shown in FIG. 9a, arrives at the external edge 138 of the periphery of the record, the resistance value of the CdS slit 33 slightly varies by dint of the reflected light which it receives upon its arrival at said periphery, while the resistance value of the CdS slit 32 remains to be very high because it is positioned immediately above the said piece of black cloth. This results in a great increase in the resistance ratio between CdS slit 33 and CdS slit 32, so that as a result a signal corresponding to that indicated by numeral 50' in FIG. 9b is first generated. At this point, the CdS slit 134 is connected by the lead wires 135 and 136 as shown in FIG. 7b and the switch 140 is closed and is not actuated yet. Simultaneously with the peripheral edge being detected by the CdS slit 33, the switch 140 is opened by the counter mechanism which will be described later, and the CdS slit 134 is actuated. The counter mechanism herein referred to points to such commonly known relay counter which is adapted to effect stepping by the contact of the relay 48 in FIG. 7a. By utilizing this contact, the "normally closed" contact is opened with the first count, and by having it to continue this open state for the subsequent counts, a possible miscounting due to the shape of the periphery of the record can be prevented in such manner as will be described below. The CdS slit 134 still being positioned above the piece of black cloth 139 as shown in FIG. 6*b*, it has a very high value of resistance. The CdS slit 33 drops slightly as the latter is exposed to the reflected light from the peripheral edge of the record. The initial resistance ratio between these two CdS photoelectric elements 134 and 32 is thus reversed, and as a result, a signal corresponding to that designated by numeral 52′ in FIG. 9*b* is produced, indicating that the counting of the peripheral edge of the record has been accomplished.

Subsequently, as the CdS slits 32, 33 and 134 enter the area, for example, 141, of the record face and as the CdS photoelectric element arrives at the position where it is exposed to the reflected light from the face of the record, the resistance value of the CdS slit 134 drops substantially, while the switch 140 in FIG. 7*b* is opened. Since the CdS slit 134 is of a zigzag form, the resistance value of this slit is maintained at a level much lower than the value of the CdS slit 33 even when the CdS slit 134 is actuated, and therefore, despite the fact that the CdS slit 134 is connected in series, the resistance value of the CdS 134 can be disregarded. Thus, after the entry of the CdS photoelectric element into the record face area, the CdS 134 substantially ceases to produce its own effect.

FIG. 7*c* illustrates a case where the limited amount of the change in the value of resistance of the CdS 134 is amplified by the transistor 142. When the CdS slit 33 is positioned above the piece of black cloth 139, the switch 143 is in the open state, and therefore, the transistor 142 has no effect on the behaviour of the CdS slits 32 and 33. Accordingly, in the same way as has been described above, the CdS slits 32 and 33 produce a signal 50′ in FIG. 9*b*.

By this detection, the contact of the relay counter similar to that previously described is shifted at the first count from the state of "normally open" to the closed state, and is held in this state, namely, the switch 143 in FIG. 7*c* is closed. Since, at this point, the CdS slit 134 is positioned above the piece of black cloth 139, it has a resistance value greater than the value of the fixed resistor 144. Accordingly, the voltage of the base of the transistor 142 approaches —E*bb* and puts the transistor 142 into the conducting state. Thus, the internal resistance between the collector and the emitter of the transistor 142 causes the CdS 32 to be short-circuited. Whereupon, the resistance ratio between the CdS slits 33 and 32 is reversed, and the signal 52′ in FIG. 9*b* is formed. When subsequently the CdS 134 arrives at a position above the record face where it is exposed to the reflected light from the face of the record, the resistance value of the CdS 134 drops, and the resistance ratio between it and the fixed resistor 144 causes the base voltage of the transistor 142 to approach zero, putting the transistor 142 substantially into the "cut-off" state. Therefore, even when the switch 143 is closed, the CdS slits 32 and 33 receive no effect whatsoever from the transistor 142. For the foregoing reason, by forcibly forming the signal 52′ in FIG. 9*b* by the use of the CdS 134, the CdS slit 33 can form the signal 50′ in FIG. 9*b* from the slightest amount of light to which it is exposed, since the resistance value of the CdS slit 32, at such time, is at an elevated level due to the piece of black cloth 139. Thus, correct counting of the periphery of the record is effected, irrespective of the shape of the peripheral edge.

In case the CdS 134 is not provided, when CdS 33 enters the area 141 of sound grooves after the CdS 33 has formed the signal 90′ in FIG. 9*b*, it is exposed to a light which is more intensive than the light which is projected to the CdS slit 32, as the light to which the CdS slit 32 is exposed is very slight even when the CdS slit 32 is positioned above the periphery 138 of the record, and therefore, the signal 52′ in FIG. 9*b* is not formed, which constitutes the cause of miscounting.

FIG. 7*d* illustrates an example where a diode 145 is used in place of the transistor 142. When the switch 143 is closed upon the detection of the periphery by the CdS slit 33, the diode 145 conducts the current as a result of the electric potential of the input point 136 being closer to —E*bb* than to the potential of the input point 34. Therefore, the resistor 144 which has a value substantially lower than that of the CdS slit 32 produces an effect similar to that when "the CdS slit 32 is short-circuited as a result of the shifting of the state of the transistor 142 in FIG. 7*c* to from the fact that three CdS slits are used. However, any record face, the diode 145 does not conduct the current because the potential of the input point 136 is closer to the ground point than to the electric potential of the input 34, and as a result an effect similar to that when the transistor 142 is put into the "off" state is produced.

Various modifications of the circuit may be considered from the fact that three CdS slits are used. However, any modification of circuit which is intended to produce an effect similar to that when the third CdS slit is used is included within the scope of the claim of the present invention.

The sensitivity switching resistors 37 and 38 in FIG. 7*a* are not necessarily required in the circuits shown in FIGS. 7*b*, 7*c* and 7*d*, and for this reason, they are not mentioned in the drawings. The record face has to be spotted by a beam of light of a substantial area because the beam has to accommodate therein all of the CdS slits 32, 33 and 134, and because the light reflected from the record face to each of these slits has to be uniform in condition.

FIG. 20*a* is a plane view of the record having eight tune bands. FIG. 20*b* is a cross sectional view of the record in FIG. 20*a*, which is presented as an example of the records to be detected according to the present invention, wherein numerals 121 through 128 represent the first to the eighth un-recorded zones, while numerals 121*a* through 128*a* representing the first to the eighth recorded bands.

While description of the present invention has been made in connection with the transistor circuits, the present invention can be applied also to the vacuum tube circuits. Although in the embodiments of the present invention herein provided use CdS as the photoelectric element, such photoelectric element may be formed with any material such as photo-cell, photo-diode or photo-transistor, which is capable of detecting the intensity of light. A miniature electric bulb is used as the light source of the examples of the present invention, but this may be replaced by a discharge tube. Also, the lens may be substituted by a pencil beam. Furthermore, any level-establishing circuit, other than the Schmidt circuit, which is capable of establishing two levels is included within the scope of the claim of the present invention. Also, the arrangement which requires no emitter follower circuit because of the low impedance of the photoelectric element is included within the scope of the present invention. Still further, any modification of circuit wherein two or more photoelectric elements are used to obtain an effect similar to that provided by the present invention is included within the scope of the present invention. Further, any modification of detecting unit wherein two or more photoelectric elements are used to obtain an effect similar to that provided by the present invention is included within the scope thereof.

What we claim is:

1. A detecting unit for use in automatic tune selection apparatus comprising a detector adapted to project light rays from a light source to a portion of the face of a gramophone record in such manner that the reflected light rays from a mirror face portion of an un-recorded zone of the record may be projected onto a plurality of photoelectric elements; a circuit having a first and a second ones of said a plurality of photoelectric elements symmetrically connected relative to an input point of said circuit, said circuit being arranged in such manner that a first one of said plurality of photoelectric elements is used for the detection of the location of an un-recorded portion of the record and that said a second one of said photoelectric elements is used for correcting the reflection factor of the record face and for correcting the variation factors of the photoelectric elements and also in such manner that a signal wave form symmetrical relative to an input level is produced; and a circuit arranged to form a shaped pulse corresponding to an un-recorded portion by two levels of a bi-stable circuit having hysteresis established close to the peak points of said signal wave, respectively.

2. A detecting unit described in claim 1, wherein said light rays from said light source comprise diffused light rays from a light source which is a point light source.

3. A detecting unit described in claim 1, wherein said light rays from said light source are modified into parallel light rays through a lens.

4. A detecting unit described in claim 1, wherein the distance between said a first and a second ones of the photoelectric elements is greater than the length of the peripheral un-recorded area of the record face.

5. A detecting unit described in claim 1, wherein a mask having slits is mounted on each of said photoelectric elements to shield the entry, into said photoelectric elements, of irregular light rays due to the colour of the record face reflected from said record face.

6. A detecting unit described in claim 1, wherein a mask having slits is mounted on said light source to restrict the entry, into said photoelectric elements, of irregular light rays due to the colour of the record face reflected from said record face.

7. A detecting unit described in claim 1, wherein a mask having slits is mounted on said photoelectric elements and also on said light source to shield and restrict the entry, into said photoelectric elements, of irregular light rays due to the colour of the record face reflected from said record face.

8. A detecting unit described in claim 1, wherein the reflection factor of said reflected light is enhanced by arranging the angle of incident light rays relative to the record face so as to be smaller than the critical angle of reflection, whereby the face of any record, say, black, white, red or translucent, may be detected equally as a mirror face.

9. A detecting unit described in claim 1, wherein there is provided an emitter follower circuit operable to effect impedance matching of an output impedance of said photoelectric elements to said bi-stable circuit.

10. A detecting unit described in claim 1, wherein a third one of said photoelectric elements is used for the detection of an un-recorded portion of the periphery of the record.

11. A detecting unit described in claim 10, wherein said a third one of the photoelectric elements is provided externally relative to said a first one of the photoelectric elements in such manner that the distance between said a third one of said photoelectric elements and said a first one of the photoelectric elements is greater than the length of the un-recorded peripheral portion of the record face, said a third one of the photoelectric elements being connected in series to said a first one of the photoelectric elements so that said a third one of the photoelectric elements is not actuated until said a first one of the photoelectric elements detects the un-recorded peripheral portion of the record face and that said a third one of the photoelectric elements is actuated upon accomplishment of detection of said peripheral portion by said a first one of the photoelectric elements thereby producing a shaped pulse by virtue of the high resistance of said third one of the photoelectric elements irrespective of whether said a second one of the photoelectric elements has detected said peripheral portion; and wherein said a first one and said a third one of the photoelectric elements are connected in series so that the resistance value of said a third one of the photoelectric elements may be negligibly lowered when said a third one of the photoelectric elements has arrived at the record face, whereby permitting the un-recorded peripheral portion of the record face having no flat area to be detected.

12. A detecting unit described in claim 10, wherein said a third one of the photoelectric elements is provided externally relative to said a first one of the photoelectric elements in such manner that the distance between said a third one of said photoelectric elements and said a first one of the photoelectric elements is greater than the length of the un-recorded peripheral portion of the record face, and wherein a collector and an emitter of a transistor are connected in parallel connection to said a second one of the photoelectric elements so that said transistor may short-circuit said a second one of the photoelectric elements upon receiving a signal from said a third one of the photoelectric elements, said transistor being not actuated until an un-recorded peripheral portion of the record face has been detected by said first one of the photoelectric elements, said transistor being actuated upon accomplishment of detection of said peripheral portion by said first one of the photoelectric elements, thereby putting said transistor into conducting state by virtue of the high resistance value of said a third one of the photoelectric elements irrespective of whether said peripheral portion has been detected by said second one of the photoelectric elements, substantially short-circuiting said a second one of the photoelectric elements, producing a shaped pulse, and lowering the resistance value of said a third one of the photoelectric elements when it arrives on the record face so that said transistor is put into cut-off state in such manner that the internal resistance value of said transistor may be negligible, whereby permitting the un-recorded peripheral portion of the record face having no flat area to be detected.

13. A detecting unit described in claim 10, wherein said a third one of the photoelectric elements is provided externally relative to said a first one of the photoelectric elements in such manner that the distance between said a third one of said photoelectric elements and said a first one of the photoelectric elements is greater than the length of the un-recorded peripheral portion of the record face, and wherein a resistor is provided in series to said a third one of the photoelectric elements, and wherein said a second one of the photoelectric elements is adapted to be short-circuited by said resistor through a diode and a switch, said diode being not actuated until an un-recorded peripheral portion of the record face has been detected by said a first one of the photoelectric elements, said diode being actuated upon accomplishment of detection of said peripheral portion by said a first one of the photoelectric elements thereby putting said diode into conducting state by virtue of the high resistance of said a third one of the photoelectric elements irrespective of whether said a second one of the photoelectric elements has detected said peripheral portion, and thereby short-circuiting said a second one of the photoelectric elements by said resistor connected in series to said a third one of the photo-electric elements, and thereby producing a shaped pulse, whereby lowering the resistance value of said a third photoelectric elements when it arrives on the record surface and putting said diode into non-conducting state in such manner that the effect of said a third one of the photoelectrci elements may become negligible, whereby permitting the un-recorded peripheral portion of the record face having no flat area to be detected.

No references cited.

RALPH G. NILSON, *Primary Examiner.*

M. ABRAMSON, *Assistant Examiner.*